(12) United States Patent
Osterlaenger et al.

(10) Patent No.: US 8,943,916 B2
(45) Date of Patent: Feb. 3, 2015

(54) CHASSIS ACTUATOR

(75) Inventors: Juergen Osterlaenger, Emskirchen (DE); Mark Lauger, Pretzfeld (DE); Thomas Mehlis, Kleinsendelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 389 days.

(21) Appl. No.: 13/238,492

(22) Filed: Sep. 21, 2011

(65) Prior Publication Data

US 2012/0132019 A1 May 31, 2012

(30) Foreign Application Priority Data

Nov. 30, 2010 (DE) .......................... 10 2010 052 920

(51) Int. Cl.
*F16H 25/22* (2006.01)
*B62D 17/00* (2006.01)
*B60G 7/00* (2006.01)

(52) U.S. Cl.
CPC .......... *B60G 7/006* (2013.01); *B60G 2202/422* (2013.01)
USPC ......... 74/89.39; 74/89.38; 280/5.5; 280/5.52; 192/223.4

(58) Field of Classification Search
CPC ................... F16H 2025/2463; F16H 25/2454; F16H 2025/2081; B60G 7/006; B60G 2200/422; B60G 2200/46; B60G 2200/462; B60G 2204/46; B60G 2202/422
USPC ....................... 74/89.23, 89.37, 89.38, 89.39; 192/223.4
See application file for complete search history.

(56) References Cited

U.S. PATENT DOCUMENTS

| 2,598,993 | A | * | 6/1952 | Gorske ...................... 192/223.4 |
| 2,881,881 | A | * | 4/1959 | Sacchini et al. ........... 192/223.4 |
| 3,111,822 | A | * | 11/1963 | Hansen ............................ 464/40 |
| 4,246,991 | A | * | 1/1981 | Oldakowski ............... 192/223.4 |
| 4,603,594 | A | * | 8/1986 | Grimm ........................ 74/89.39 |
| 4,987,788 | A | * | 1/1991 | Bausch ........................ 74/89.34 |
| 5,058,445 | A | * | 10/1991 | Nilsson ......................... 74/89.4 |
| 5,135,067 | A | * | 8/1992 | Kohata et al. ................. 180/445 |
| 5,595,089 | A | * | 1/1997 | Watanabe et al. ............ 74/89.34 |
| 6,158,295 | A | * | 12/2000 | Nielsen ........................ 74/89.38 |
| 6,378,646 | B1 | * | 4/2002 | Bugosh ......................... 180/444 |
| 6,394,248 | B1 | * | 5/2002 | Monahan et al. ............. 192/41 S |
| 7,621,539 | B2 | * | 11/2009 | Choi et al. ................... 280/5.52 |
| 7,997,596 | B2 | * | 8/2011 | Yuta et al. ................ 280/86.758 |

(Continued)

FOREIGN PATENT DOCUMENTS

DE          38 36 255 A1    4/1990

*Primary Examiner* — Troy Chambers
*Assistant Examiner* — Valentin Craciun
(74) *Attorney, Agent, or Firm* — Simpson & Simpson, PLLC

(57) ABSTRACT

A chassis actuator adjusting a movably mounted component of a chassis, which has a first actuator component connected to the movably mounted component and a second actuator component connected to a fixed chassis component. The actuator components are adjustable axially by a ball screw that has a threaded spindle and a nut which runs on spindle. The nut is driveable by a drive motor that has a rotor coupled to the nut and a fixed stator arranged axially symmetrically with respect to the nut. The rotor is coupled to the nut by a wrap spring which radially surrounds the nut and via which the nut is rotated during rotation of the rotor and which forms a brake device. The brake device can be actuated by an external chassis force which acts on and rotates the nut and builds up a friction moment that counteracts the rotation of the nut.

14 Claims, 5 Drawing Sheets

(56) References Cited

U.S. PATENT DOCUMENTS

| | | | |
|---|---|---|---|
| 8,516,914 B2* | 8/2013 | Osterlanger et al. | 74/89.39 |
| 2004/0149977 A1* | 8/2004 | Parsadayan et al. | 256/73 |
| 2005/0115793 A1* | 6/2005 | Fluckiger et al. | 192/223.4 |
| 2006/0219486 A1* | 10/2006 | Wagner et al. | 188/1.11 L |
| 2006/0243075 A1* | 11/2006 | Liou et al. | 74/89.39 |
| 2007/0220998 A1* | 9/2007 | Kopecek | 74/89.39 |
| 2008/0079225 A1* | 4/2008 | Choi et al. | 280/5.52 |
| 2009/0044646 A1* | 2/2009 | Duck et al. | 74/89.39 |
| 2011/0107859 A1* | 5/2011 | Osterlanger et al. | 74/89.37 |
| 2013/0217524 A1* | 8/2013 | Antchak et al. | 474/94 |
| 2014/0238809 A1* | 8/2014 | Boyes et al. | 192/75 |

\* cited by examiner

CHASSIS ACTUATOR

CROSS-REFERENCE TO RELATED APPLICATION

This application claims the priority of DE 10 2010 052 920.6 filed Nov. 30, 2010 and this application is incorporated by reference herein.

FIELD OF THE INVENTION

The invention relates to a chassis actuator for adjusting a movably mounted component of a vehicle chassis.

BACKGROUND OF THE INVENTION

Chassis actuators of said type are being increasingly used in so-called "active" chassis. There, said chassis actuators serve for example for toe or camber adjustment or for adjusting the vehicle ride height. Said adjustment is made possible in that the actuator has two actuator components which are movable relative to one another, one of which actuator components is arranged on a first chassis part and the other of which is arranged on a second chassis part. The two actuator components are connected by means of a ball screw which in turn can be driven by means of an electric motor which can be actuated by means of a suitable control device. When the electric motor is in operation, the nut is rotated relative to the spindle by means of the electric motor, which spindle is, as a result, displaced axially, thereby effecting the axial adjustment of the actuator components and, as a result, the adjustment of the chassis.

A problem with such chassis actuators is that forces acting externally on the chassis actuator, that is to say forces which are introduced into the actuator via the chassis itself, can lead to an unintentional adjustment of the actuator and therefore of the selected chassis setting, for which reason said forces must be absorbed or the actuator must be fixed in the selected adjustment position. This may be realized directly by means of the electric motor itself, that is to say said electric motor is provided with a continuous supply of electrical current in order to hold the actuator in the desired position. This however involves a large amount of expenditure in terms of control and also with regard to energy balance.

DE 38 36 255 C2 discloses a chassis actuator of the type mentioned in the introduction, in which, aside from a planetary gear set which couples the rotor in terms of movement to the nut and which is of complex design, an electromagnetic jaw clutch is provided for blocking the spindle nut when the electric motor is not supplied with electrical current. Said jaw clutch comprises a clutch disk which is arranged in an axially movable but non-rotatable manner on a collar, which faces away from the electric motor, of a spindle nut flange. The clutch disk is preloaded in the direction of the end wall of the actuator housing by means of a spring. By means of in each case one spur toothing on the clutch disk and the inner side of the end wall, it is possible in the engaged state of the clutch disk to obtain a positively locking connection of the clutch disk to the end wall, and to thereby obtain blocking of the spindle nut and of the threaded spindle. For decoupling of the claw clutch, an annular magnet is provided on the side of the spring, which annular magnet, when excited, pulls the clutch disk out of the spur toothing counter to the force of the spring, and consequently eliminates the blocking action. It is thus possible by means of said blocking device for the actuator to be fixed in position by purely mechanical means when the electric motor is not actuated. However, firstly, the design involves a high level of expenditure from both a structural and also a functional aspect, and secondly, a simultaneous supply of electrical current is always necessary both to the electric motor and to the annular magnet which opens the jaw clutch. If a supply of electrical current to the annular magnet is not possible on account of a fault, an adjustment of the actuator is not possible.

SUMMARY OF THE INVENTION

The invention is therefore based on the problem of specifying a chassis actuator which is of relatively simple construction and which has a high level of functional reliability.

To solve said problem, in a chassis actuator comprising a first actuator component for connecting to the movably mounted component and a second actuator component for connecting to a positionally fixed chassis component, wherein the two actuator components can be adjusted axially by means of a ball screw comprising a threaded spindle and comprising a nut which runs on said threaded spindle, and wherein the nut can be driven by means of a drive motor, which is designed as an electric motor comprising a rotor coupled in terms of movement to the nut and comprising a positionally fixed stator arranged axially symmetrically with respect to the nut, for the axial adjustment of the threaded spindle, it is provided that the rotor, which is rotatably mounted on the nut by means of two bearings axially spaced apart from one another, is coupled in terms of movement to the nut by means of a wrap spring which radially surrounds the nut and via which the nut is rotated during rotation of the rotor and which forms a brake device, which brake device can be actuated by means of an external chassis force which acts on and rotates the nut and which brake device builds up a friction moment which counteracts the rotation of the nut.

In the actuator according to the invention, firstly, the rotor is rotatably mounted exclusively on the nut of the ball screw, which is advantageous not least from an assembly aspect. In the chassis actuator according to the invention, for movement coupling and also for blocking of the ball screw, only a wrap spring is provided via which the rotor is connected to the nut. If the rotor rotates, then after the rotor has rotated relative to the nut by a defined angular increment, the nut is driven by the wrap spring, such that an axial adjustment of the spindle takes place. The movement coupling between the rotor and nut via the coil wrap spring is self-evidently configured such that driving of the nut and, as a result, a spindle adjustment is possible in both rotor rotational directions. This is however the case only when the movement or the force which acts on the actuator or the ball screw is actively introduced via the rotor. In contrast, if an external force is introduced into the system via the chassis, which force is introduced via the spindle, a very small, defined relative movement takes place between the nut and rotor, that is to say the nut is rotated relative to the stationary rotor by a small angular increment. Said rotation has the result that the coil wrap spring, depending on its design, is expanded or contracted, such that in any case, a friction moment is built up which counteracts the further rotation of the nut. The ball screw is blocked, and the external force, no matter how large, cannot lead to a further rotation of the nut because the friction moment built up by means of the wrap spring counteracts said force.

As is evident, the structural design of the chassis actuator according to the invention is significantly simpler than that of the actuator known from the prior art. Neither a movement-coupling planetary gear set nor a cumbersome coupling mechanism using a magnet element, which itself must be actively actuated, is used. In fact, purely mechanical movement coupling and movement blocking is realized in the chassis actuator according to the invention. Also, on account of the radially and axially optimized construction in the region of the movement coupling and of the blocking, that is to say in the region between the rotor and nut, a design is obtained which is optimized in terms of installation space.

As described, the mounting of the rotor is realized by means of two bearings by means of which the sleeve-shaped rotor is mounted in the region of its two ends on the nut. One bearing is expediently a fixed bearing while the other bearing is a floating bearing. As a floating bearing of said type, use may be made for example of a needle-roller bearing or a plain bearing. This is directly possible here because, in the event of an actuation of the chassis actuator, the nut and the rotor rotate at different rotational speeds only for a very short moment. When the movement coupling by means of the wrap spring takes effect, the rotor and the nut rotate at the same speed, such that simply-designed bearings, such as exactly the described needle-roller bearing or a plain bearing, can be directly used in the actuator according to the invention.

For assembly reasons, it is particularly advantageous for the floating bearing to be arranged in the region of that end of the rotor which is connected to the wrap spring. The floating bearing, that is to say for example the needle-roller bearing, is pressed into the rotor before the insertion of the latter and is pushed together with the rotor onto the nut, which considerably simplifies assembly.

The fixed bearing itself may be any desired bearing; use is preferably made here of a ball bearing or a four-point bearing. According to one refinement of the invention, for secure fixing, the fixed bearing may be fixed with its inner ring to the nut by means of two circlips and to the rotor by means of contact with its outer ring against an annular collar with a further circlip. The fitting of the circlips and, as a result, the fixing of the bearing, is also very simple and facilitates assembly.

In a refinement of the invention, the nut may additionally be mounted by means of a floating bearing on a housing component, in particular a housing cover, which permits an increase in the stiffness of the nut-rotor unit. In this case, the nut is also mounted on the housing by means of two bearings, specifically a bearing which is designed preferably as a fixed bearing and by means of which the nut is mounted in the region of one end thereof on a housing component, whereas the other end of said nut is mounted on another housing component, preferably on the described housing cover, by means of the described floating bearing. The rotor mounting and also the wrap spring coupling are situated between said two bearings.

The rotor itself is formed preferably in the manner of a sleeve, that is to say is a simply designed component which may also have a small wall thickness, because it ultimately serves merely to transmit the torque to the wrap spring and, via the latter, to the nut.

The inner diameter of the stator is slightly larger, over a length overlapping the rotor, than the outer diameter, such that a small air gap is formed. In particular in conjunction with the sleeve-like design of the rotor, this results overall in an advantageously low construction as viewed radially.

The nut, too, is preferably of hollow cylindrical and sleeve-like design. Closing elements, for example driver shoes and the like, which interact with the wrap spring are arranged on, in particular pressed onto, the outer side of said nut, interact with a correspondingly guided, for example angled end of the wrap spring. The rotor self-evidently also has corresponding closing elements which interact with the other end of the wrap spring and which drive the wrap spring. Said closing elements may be integrally formed on or likewise pressed onto or into the rotor.

BRIEF DESCRIPTION OF THE DRAWINGS

An exemplary embodiment of the invention is illustrated in the drawings and will be described in more detail below. In the drawings.

DETAILED DESCRIPTION OF THE INVENTION

Figure 1:
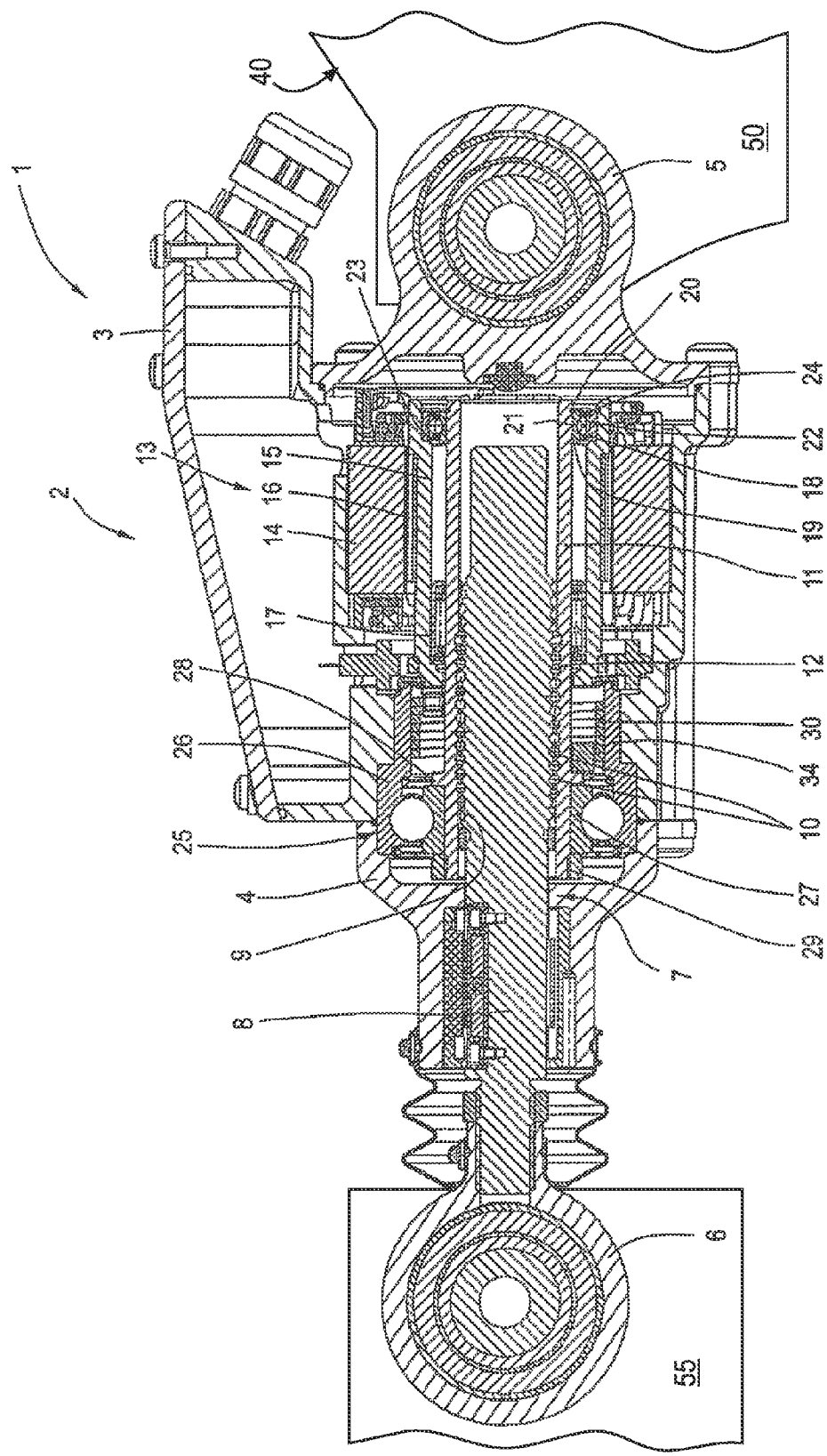
FIG. 1 shows a sectional view through a chassis actuator according to the invention in a first embodiment.
Figure 2:
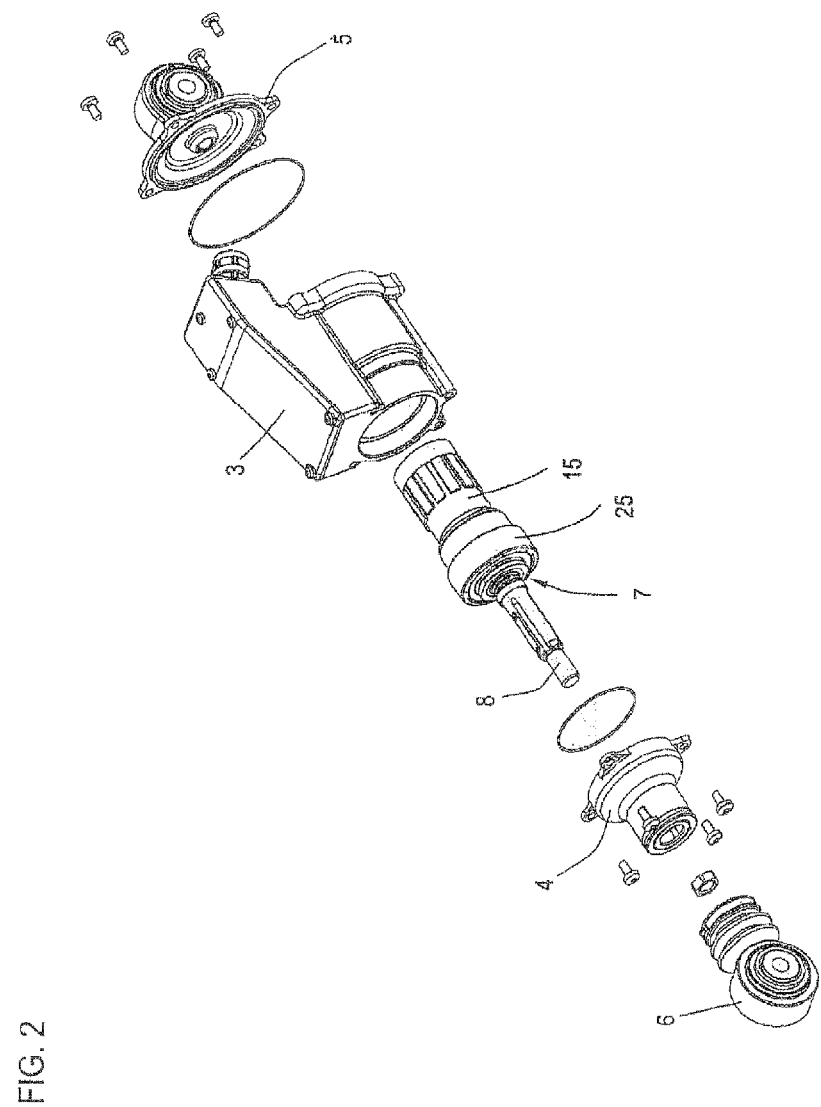
FIG. 2 shows an exploded illustration of the main individual parts of the chassis actuator from FIG. 1.
Figure 3:
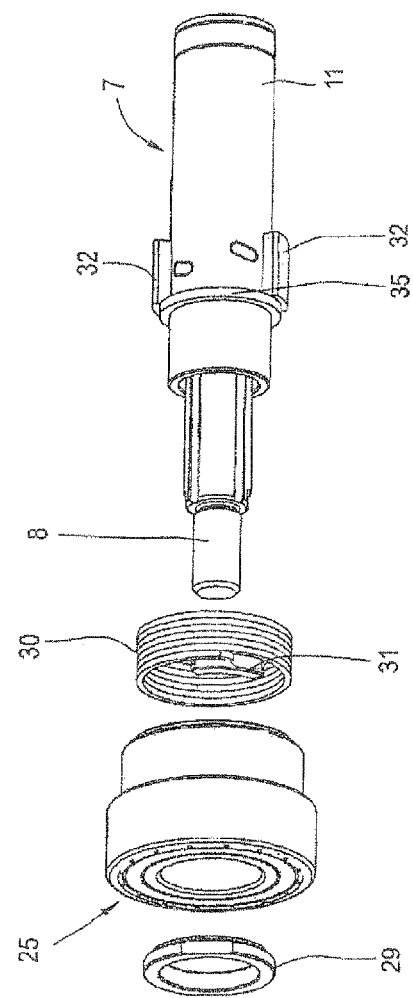
FIG. 3 shows an exploded illustration of a module of the chassis actuator, comprising the ball screw, the wrap spring and a bearing which serves for mounting the nut of the ball screw.
Figure 4:
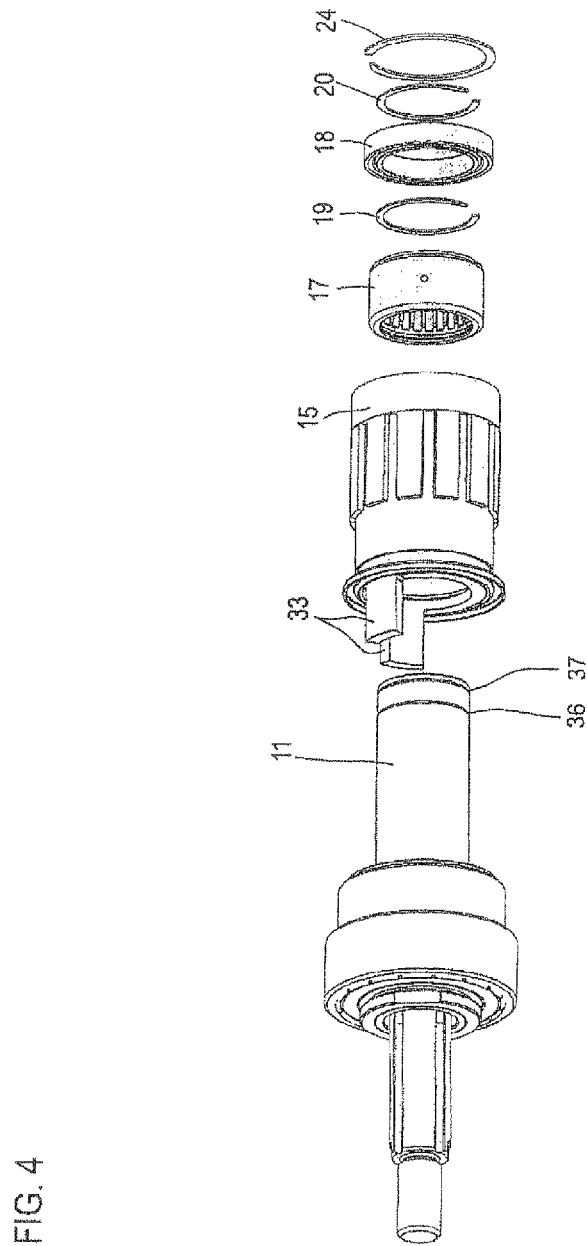
FIG. 4 shows a further exploded illustration of a further module of the chassis actuator, comprising the assembled module from FIG. 3 and additionally the rotor together with its bearings.

FIG. 1 shows a sectional view through a chassis actuator 1 according to the invention, which is shown in even greater detail in the exploded illustrations of FIGS. 2-4. The chassis actuator 1 comprises a housing 2, composed of a first, relatively large 5 housing component 3 and a second, relatively small housing component 4. On the housing component 3, there is arranged an actuator component 5 which closes off the housing to one side, and on the opposite side there is situated a second actuator component 6, which is connected to a threaded spindle of a ball screw yet to be described below. The two actuator components 5, 6 can be adjusted axially relative to one another 10 by means of the ball screw yet to be described. The actuator component 5 should be fastened to a first chassis component 50, whereas the actuator component 6 should be attached to a second chassis component 55 which is to be moved relative to the first chassis component 50 of a vehicle chassis 40. It should be appreciated that in an alternate embodiment the actuator component 5 is fastened to the second chassis component 55 (the movably mounted component) and the actuator component 6 is fastened to the first chassis component (the positionally fixed chassis component). In other words, it should be understood that the actuator component 5 could be either fixed to a positionally fixed chassis component 50 or a movably mounted component 55. Depending on which component the actuator component 5 is fastened, the actuator component 6 is fastened to the other component so that one actuator component is movable with respect to the other.

As described, a ball screw 7 is provided, comprising a threaded spindle 8 which has an external thread 9. A sleeve-like nut 11 runs, mounted by means of balls 10, on the threaded spindle 8, which nut has an internal thread 12 in which the balls 10 run. Whereas the nut is mounted in a positionally fixed manner in the housing 2, the threaded spindle 8 is axially movable, resulting in the axial adjustability of the actuator components 5, 6 relative to one another.

To drive the nut 10 in rotation, an electric motor 13 is provided, comprising a stator 14 and a sleeve-shaped rotor 15 which are spaced apart from one another by means of an air gap 16 in a manner known per se. The rotor 15 is mounted directly on the outside of the sleeve-shaped nut 11 by means of a first bearing, in this case a floating bearing 17 in the form of a needle-roller bearing which is pressed into the sleeve-shaped rotor 15. At the other end, the sleeve-shaped rotor 15 is mounted likewise directly on the nut 11 by means of a second bearing, in this case a fixed bearing 18. Said fixed bearing 18 is fixed with its inner ring 21 to the nut 11 by means of a first circlip 19, which is arranged on the nut in a groove, and a second circlip 20, which is likewise arranged on the nut. The outer ring 22 of the fixed bearing 18 bears against a stop collar 23 of the rotor, and the other side of the outer ring is retained by means of a third circlip 24 which is fixed in a corresponding groove on the rotor.

The rotor 15 rotates when the electric motor 13 is operated, that is to say when the stator 14 is supplied with electrical current. As a result, the nut 11 is rotated, which in the exemplary embodiment shown in FIG. 1 is rotatably mounted on the housing 2 by means of a fixed bearing 25. The outer ring 26 of the fixed bearing is held in a corresponding housing groove, whereas the inner ring 27 of the fixed bearing 25 bears against a stop collar 28 of the nut 11 and is fixed in position at the opposite side by means of a further circlip 29. To be able to rotate the nut 11, movement coupling between the rotor 15 and nut 11 is required, which movement coupling is realized here by means of a wrap spring 30. The wrap spring 30 has respective drivers 31 at its two ends, which drivers interact with corresponding closing elements 32 on the nut and 33 on the rotor, respectively, in a manner known per se. In the assembled position, the respective closing elements 32, 33 engage into the wrap spring 30, such that in the event of a rotation of the rotor, the respective closing element 33 which is active depending on the rotational direction engages on the respective driver side of the driver 31 and thereby twists the wrap spring. Said torsional or rotational movement is transmitted via the other driver side, or the other driver 31 respectively, to the corresponding closing element 32 of the nut 11, such that the latter is rotated. Said rotation results, in turn, in the axial movement of the spindle 8 which runs in the nut 11. Because in each case two closing elements 32, 33 are provided, an active actuating movement in both directions is evidently obtained.

The wrap spring 30 however serves not only to couple the rotor 15 and nut 11 to one another in terms of movement but rather also to block the ball screw 7 in order to prevent the latter from being inadvertently adjusted. If an external force acts on the threaded spindle for example via the actuator component, this causes a slight rotational movement of the nut 11. Said rotational movement results in one of the closing elements 32 in turn engaging on the driver 31. As a result, the wrap spring 30 is expanded, in contrast to normal active actuating operation when the rotational movement is introduced via the rotor 15, during which the wrap spring 30 is contracted. As a result of the expansion of the wrap spring which however occurs in this operating situation, the outer side of the wrap spring 30 bears against the inner side of the cylindrical extension section 34 of the outer ring 26 of the fixed bearing 25. In this way, a friction moment is built up which becomes ever greater with increasing acting force and resulting rotation of the nut 11, until complete blockage occurs. The angular rotation of the nut before said blocking takes effect is relatively small, and amounts to only a few degrees, such that ultimately no actuator adjustment occurs. That is to say, the wrap spring here performs a double function, specifically firstly that of the movement coupling of the rotor 15 and nut 16, and secondly that of the formation of a blocking or arresting element.

FIG. 2 shows the main components in an exploded illustration, wherein the main part component comprising the ball screw 7 and the rotor 15 is shown already in the assembled position.

FIG. 3 shows, in the form of an exploded illustration, the ball screw drive 7 together with the spindle 8 and nut 11, onto which have been pressed the two closing elements 32 which are fixed to a carrier ring 35. For assembly, firstly the wrap spring 30 is placed onto the ball screw drive 7, such that the driver 31 engages between the two closing elements 32. The fixed bearing 25 is subsequently placed on and subsequently fixed by means of the circlip 29.

The module formed in this way is shown in FIG. 4. The rotor 15 is then to be mounted on said module. The floating bearing 17, in this case in the form of a needle-roller bearing, is firstly pressed into the rotor at the inside. The rotor 15 together with the floating bearing 17 is then pushed onto the nut 11, and the rotatable mounting on the nut 11 is realized by means of the floating bearing 17. In the next step, the circlip 19 is snapped into the groove 36 on the nut 11, whereupon the fixed bearing 18 is pushed onto the nut 11 or into the rotor 15. The outer ring and the inner ring of the fixed bearing 18 are then fixed by means of the circlip 20, which is inserted into the groove 37 on the nut, and by means of the further circlip 24, which is inserted into a groove (not shown) on the inner wall of the rotor 15. Said module, which is then fully assembled, is shown in the middle in FIG. 2. Said module is then inserted into the housing part 3, whereupon the housing part 4 is placed on and the actuator components 5, 6 are subsequently fixed with the interposition of suitable sealing rings and the like.

Figure 5:
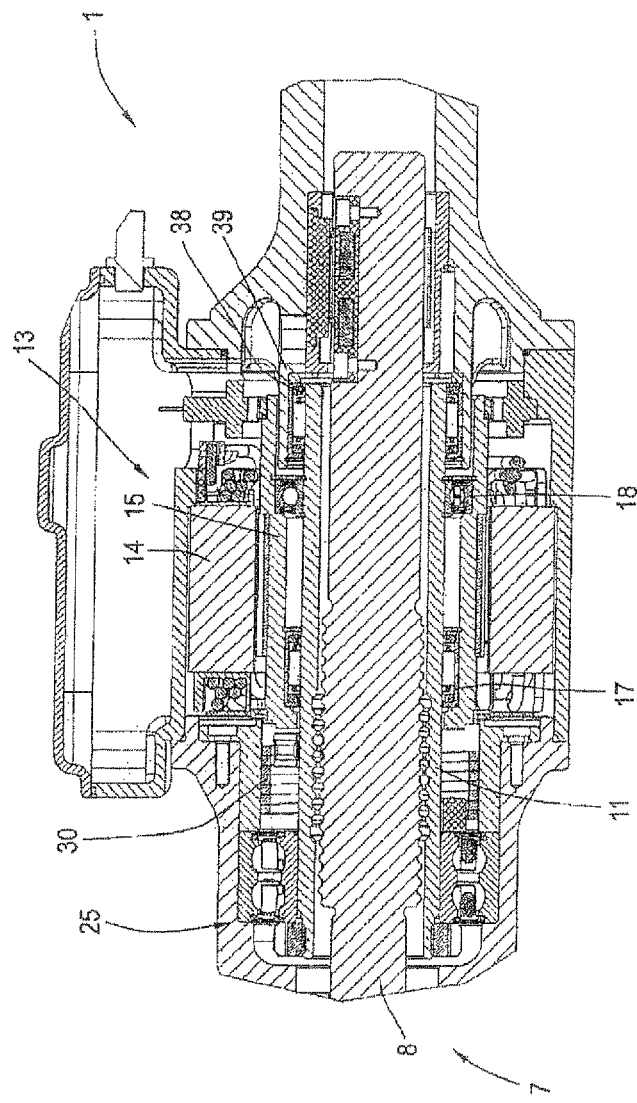
FIG. 5 shows a sectional view through a chassis actuator of a second embodiment.

FIG. 5 finally shows a further embodiment of a chassis actuator 1 according to the invention, the design of which is in this respect similar to that of the actuator 1 from FIGS. 1 to 4. The same reference numerals have therefore also been used for identical parts. Provided again are a ball screw 7 with spindle 8 and nut 11, and an electric motor 13 comprising a stator 14 and a rotor 15. The movement coupling and also the position blocking are realized again by means of a wrap spring 30 in the same way as described above.

Here, too, the rotor 15 is mounted on the nut 11 by means of a floating bearing 17 and a fixed bearing 18. Here, however, the nut 11 is additionally mounted at its second end on a housing component, in this case a housing cover 39, by means of a further floating bearing 38. The stiffness of the nut-rotor unit can be increased in this way.

LIST OF REFERENCE NUMERALS

1 Chassis Actuator
2 Housing
3 Relatively Large Housing Component
4 Relatively Small Housing Component
5 Actuator Component
6 Second Actuator Component
7 Ball Screw
8 Threaded Spindle
9 External Thread
10 Balls
11 Nut
12 Internal Thread
13 Electric Motor
14 Stator
15 Rotor
16 Air Gap
17 Floating Bearing
18 Fixed Bearing 19 Circlip
20 Circlip
21 Inner Ring
22 Outer Ring
23 Stop Collar
24 Circlip
25 Fixed Bearing
26 Outer Ring
27 Inner Ring
28 Stop Collar
29 Circlip
30 Wrap Spring
31 Driver
32 Closing Element
33 Closing Element
34 Extension Section
35 Carrier Ring
36 Groove
37 Groove on the Nut
38 Floating Bearing
39 Housing Cover
40 Vehicle chassis
50 Positionally fixed chassis component
55 Movably mounted component

The invention claimed is:

1. A chassis actuator for adjusting a movably mounted component of a vehicle chassis, comprising:
    a first actuator component for connecting to the movably mounted component;
    a second actuator component for connecting to a positionally fixed chassis component;
    a ball screw, which can axially adjust the first actuator component, comprising a threaded spindle and a nut which runs on the threaded spindle;
    two bearings axially spaced from one another radially surrounding the nut;
    a drive motor, which can drive the nut, comprising a stator arranged coaxially with respect to the nut, for axial adjustment of the threaded spindle and
    a rotor, which is rotatably mounted on the nut by the two bearings; and
    a wrap spring axially aligned with said bearings and radially surrounding the nut coupling the nut to the rotor such that rotational movement of the rotor rotates the nut and external chassis forces acting on the nut are counteracted by the wrap spring and,
    a further fixed bearing having an extension, said extension radially surrounding said wrap spring.

2. The chassis actuator according to claim 1, wherein the rotor is mounted on the nut by a fixed bearing and a floating bearing.

3. The chassis actuator according to claim 2, wherein the floating bearing is a needle-roller bearing or a plain bearing.

4. The chassis actuator according to claim 2, wherein the floating bearing is arranged in a region of an end of the rotor, which is connected to the wrap spring.

5. The chassis actuator according to claim 2, wherein the fixed bearing is a ball bearing or a four-point bearing.

6. The chassis actuator according to claim 2, further comprising two circlips and a further circlip, wherein the rotor has an annular collar and the fixed bearing has an inner ring and an outer ring and is fixed by the inner ring to the nut by the two circlips and to the rotor by contact with the outer ring against the annular collar with the further circlip.

7. The chassis actuator according to claim 1, wherein the rotor is a sleeve.

8. The chassis actuator according to claim 1, wherein an inner diameter of the stator is larger, over a length overlapping the rotor, than an outer diameter of the rotor.

9. The chassis actuator according to claim 1, wherein the nut is of hollow cylindrical and sleeve-like design.

10. The chassis actuator according to claim 1, further comprising closing elements, which interact with the wrap spring and are arranged on an outer side of the nut.

11. The chassis actuator according to claim 10, wherein the closing elements are pressed onto the outer side of the nut.

12. The chassis actuator according to claim 1, further comprising closing elements, which interact with the wrap spring and are arranged on the rotor.

13. The chassis actuator according to claim 12, wherein the closing elements are integrally formed on or pressed onto or pressed into the rotor.

14. The chassis actuator according to claim 1, wherein the drive motor is an electric motor.

* * * * *